United States Patent
Ryu et al.

(10) Patent No.: US 7,036,303 B2
(45) Date of Patent: May 2, 2006

(54) ABLATIVE BAFFLE FOR A LIQUID ROCKET ENGINE THRUST CHAMBER

(75) Inventors: Chulsung Ryu, Daejeon (KR); Wooseok Seol, Daejeon (KR); Sangyeop Han, Daejeon (KR)

(73) Assignee: Korea Aerospace Research Institute, Daejoen (KR)

( * ) Notice: Subject to any disclaimer, the term of this patent is extended or adjusted under 35 U.S.C. 154(b) by 161 days.

(21) Appl. No.: 10/734,279

(22) Filed: Dec. 15, 2003

(65) Prior Publication Data

US 2005/0097883 A1 May 12, 2005

(30) Foreign Application Priority Data

Nov. 12, 2003 (KR) .................. 10-2003-0079743

(51) Int. Cl.
*F02K 9/60* (2006.01)
*F02K 9/64* (2006.01)

(52) U.S. Cl. ..................................... 60/257
(58) Field of Classification Search .......... 60/257–260, 60/725
See application file for complete search history.

(56) References Cited

U.S. PATENT DOCUMENTS

| | | | | |
|---|---|---|---|---|
| 2,884,859 A | * | 5/1959 | Alexander et al. ............ | 60/250 |
| 3,242,670 A | * | 3/1966 | Buswell ........................ | 60/258 |
| 3,479,819 A | * | 11/1969 | Bogue ........................... | 60/258 |
| 3,545,203 A | * | 12/1970 | Rumbold ...................... | 60/258 |
| 3,742,701 A | * | 7/1973 | Feemster et al. ............. | 60/258 |
| 3,790,088 A | * | 2/1974 | Wilson ......................... | 60/258 |
| 6,352,030 B1 | * | 3/2002 | Doll et al. .................... | 60/256 |

OTHER PUBLICATIONS

"Liquid Rocket Engine Combustion Stabilization Devices," National Aeronautics and Space Administration, NASA Space Vehicle Design Criteria (Chemical Propulsion), Nov. 1974, pp. 9-35.

* cited by examiner

*Primary Examiner*—Ted Kim
(74) *Attorney, Agent, or Firm*—Armstrong, Kratz, Quintos, Hanson & Brooks, LLP (57) ABSTRACT

An ablative baffle for a liquid rocket engine thrust chamber that includes a hub member having a hollow structure, of which both top and bottom parts are open; a plurality of blade rib members, each of which is connected removably at one end to the outer surface of the hub member; and a blade-connecting member having a hollow structure, of which both top and bottom parts are open, to the inner part of which each of blade rib members is connected at the other end. An ablation cooling method is utilized which includes the composite heat resistant material structure with metal core, so that a liquid rocket engine system may be simplified, and the reliability of liquid rocket engine increases, and the manufacturing cost is cut down.

18 Claims, 7 Drawing Sheets

FIG. 12 ent invention is to provide an ablative
ABLATIVE BAFFLE FOR A LIQUID ROCKET ENGINE THRUST CHAMBER

FIELD OF THE INVENTION

The present invention is related to an ablative baffle for a liquid rocket engine thrust chamber, and more particularly, to an ablative baffle for a liquid rocket engine thrust chamber, which has the capability of reducing the combustion instability of a specific acoustic mode, which is generated during combustion inside a combustion-chamber of a liquid rocket engine thrust chamber.

DESCRIPTION OF THE RELATED ART

A liquid rocket engine thrust chamber develops thrust by ejecting high temperature and high pressure gas, which is produced from combustion of liquid propellant injected into the combustion chamber.

Such a liquid rocket engine thrust chamber has a high probability of combustion instability of specific frequencies in the spectrum, which may be generated during combustion inside the combustion chamber. Generation of combustion instability and amplification thereof cause the fatal problem of engine failure and worsen the reliability of the liquid rocket engine.

Recently, the technique of using acoustic cavities or baffles has been suggested to improve the combustion stability of liquid rocket engine thrust chamber.

Firstly, acoustic cavities are used for damping the resonance frequency of the combustion chamber by forming the space of predetermined shape in the head part, which is located in the upper part of the thrust chamber or combustion chamber. Next, a baffle is mounted on the surface, on which injectors are located, and controls the radial and/or tangential flow of combustion gas so that the resonance frequency may be damped.

The technique of using baffles is generally used to reduce combustion instability. However, the technique has a problem in that a baffle is melted or damaged because it is mounted inside the combustion chamber where high temperature and high pressure combustion gas reside. When combustion instability occurs, even other apparatuses and parts, which are connected with an engine, could be damaged.

A cooling method with propellant, which passes through cooling fluid passages in a baffle to prevent the temperature of the baffle from rising over the predetermined temperature, is generally used to protect a baffle from being melted and/or damaged.

This method has a problem in that a manufacturing method is complicated and an additional pressurizing device to inject propellant at high pressure is needed. Furthermore, the system of the engine and the entire launch vehicle may become complicated. Another method to inject propellant at high pressure without any additional device is by pressurizing a propellant tank with high pressure. This method has a fatal problem of thickening tank walls in order to endure high pressure, which increases the weight of the tank and the weight of the launch vehicle and decrease the performance of launch vehicle.

The present invention is devised to solve the above-mentioned problems.

SUMMARY OF THE INVENTION

An object of the present invention is to provide an ablative baffle for a liquid rocket engine thrust chamber, which has the capability of reducing combustion instability by a predetermined geometrical shape.

In order to achieve the object, an ablative baffle for a liquid rocket engine thrust chamber according to the present invention comprises: a hub member having a hollow structure, of which the top and bottom parts are opened; a plurality of blade rib members, each of which is connected removably at one end to the outer surface of the hub member; and a blade-connecting member having a hollow structure, of which the top and bottom parts are opened, to the inner part of which each of the blade rib members is connected at the other end.

Preferably, the hub member has a ring shape.

More preferably, the hub member has a plurality of connecting holes to each of which the blade rib member is connected at one end, and has a plurality of ignition flame inducing holes smaller than the connecting holes.

Still more preferably, centers of the connecting holes and the ignition flame inducing holes are on the same circumference of the inner or outer surface of the hub member.

Preferably, the hub member comprises: a first metal core; and a first heat resistant material formed on the surface of the first metal core.

More preferably, the outer surface of the first metal core is partly exposed in the lower part to form a recess part that is used for installation purpose.

Preferably, each of the blade rib members comprises: a second metal core; and a second heat resistant material formed on the surface of the second metal core.

More preferably, the lower part of the second metal core is exposed to form a first protrusion part.

More preferably, the width-directional cross section of the second metal core has the shape of a rectangular rod having a plurality of wedges formed in the longitudinal direction.

More preferably, a plurality of first through holes are formed in the second metal core.

Preferably, the blade-connecting member has a ring shape.

More preferably, a groove is formed on the lower surface of the blade-connecting member.

Preferably, a plurality of second through holes are formed in the blade-connecting member.

More preferably, a zirconia heat resistant coating layer is formed on the inner surface of the blade-connecting member.

Preferably, the blade-connecting member is lower in height than the blade rib member or the hub member.

Preferably, the blade-connecting member is assembled with a plurality of divided parts, each of which is connected to the blade rib member.

More preferably, the blade rib member and the divided part are formed as one body.

Still more preferably, the blade-connecting member is assembled with equal divided parts of 2N or 2N+1 wherein N is a natural number.

DETAILED DESCRIPTION OF THE PREFERRED EMBODIMENTS

Hereinafter, referring to the following appended drawings, the preferred embodiments of the present invention will be explained in detail.

Figure 1:
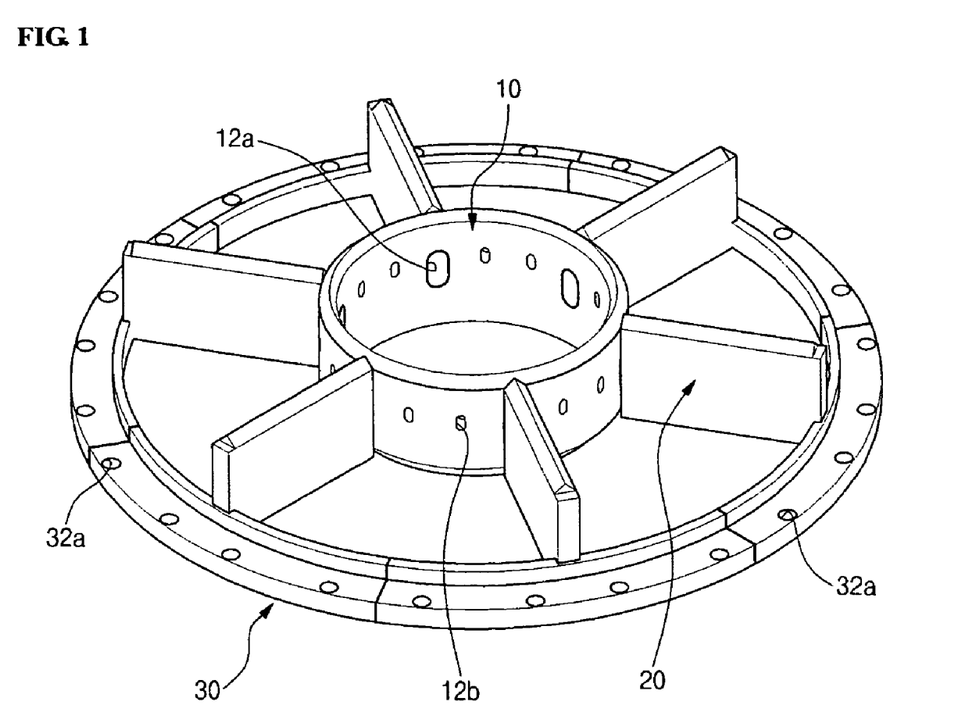
FIG. 1 is a perspective view of an ablative baffle for a liquid rocket engine thrust chamber according to the present invention.
Figure 2:
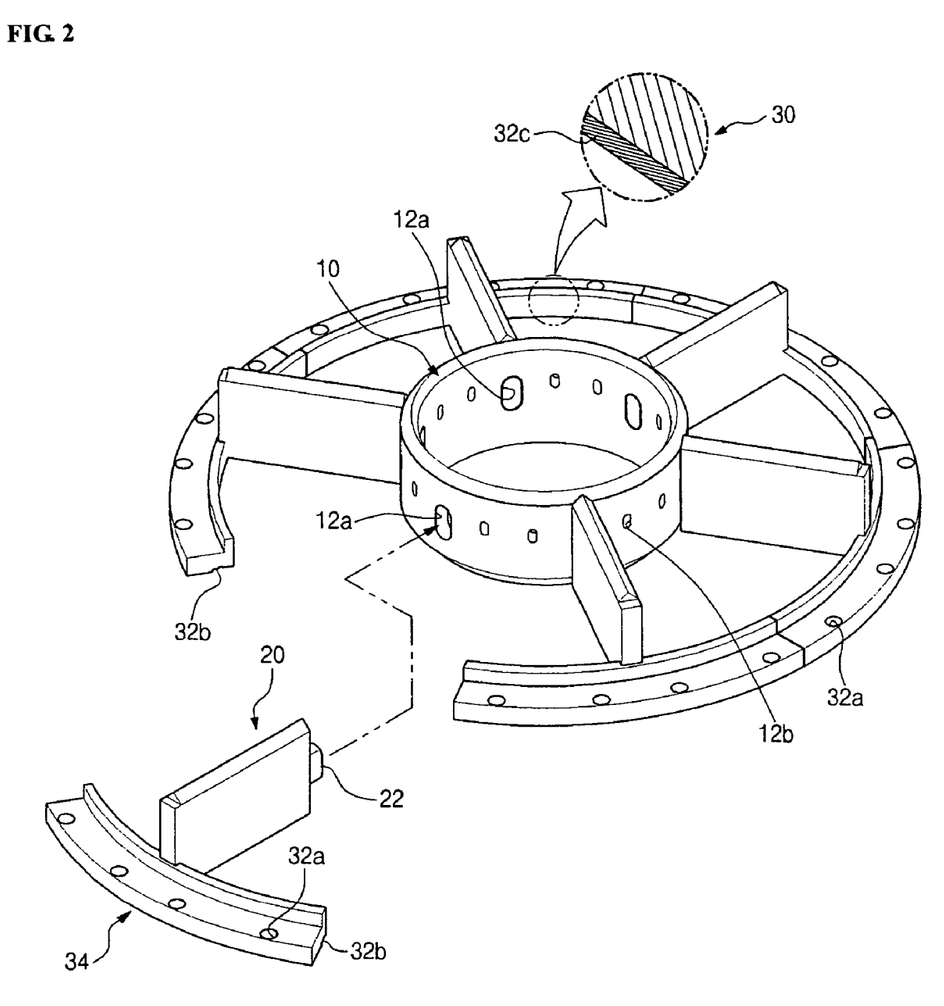
FIG. 2 is an exploded perspective view of FIG. 1.

FIG. 1 is the perspective view of an ablative baffle for a liquid rocket engine thrust chamber according to the present invention, and FIG. 2 is the exploded perspective view of FIG. 1.

Referring to FIGS. 1 and 2, an ablative baffle for a liquid rocket engine thrust chamber according to the present invention comprises a hub member 10, a plurality of blade rib members 20, each of which is connected at one end to the outer surface of the hub member 10, and a blade-connecting member 30 to the inner part of which each of the blade rib members 20 is connected at the other end.

The hub member 10 has a hollow structure, of which the top and bottom parts are open.

Preferably, the hub member 10 has a ring shape.

The hub member 10 has a plurality of connecting holes 12a to each of which the blade rib member 20 is connected at one end, and has a plurality of ignition flame inducing holes 12b smaller than the connecting holes 12a, wherein the connecting holes 12a and the ignition flame inducing holes 12b are rectangular through holes whose vertical diameters are larger than their horizontal diameters.

Furthermore, the inner center and outer center of radial end surface of connecting holes 12a and radial end surface of ignition flame inducing holes 12b are located at the inner and outer circumference surfaces of hub member 10, respectively, and a plurality of ignition flame inducing holes 12b are located between connecting holes 12a.

A second protrusion part 22 of the blade rib member 20 is inserted into the connecting hole 12a, and the opposite end of the blade rib member 20 is connected to a divided part 34 of the blade-connecting member 30. Furthermore, the blade rib member 20 is formed as one body with the divided part 34 of the blade-connecting member 30.

The blade-connecting member 30 has a hollow structure, of which the top and bottom parts are open, and is lower in height than the blade rib member 20 or the hub member 10.

Preferably, the blade-connecting member 30 has a ring or elliptical shape.

Furthermore, a plurality of second through-holes 32a are formed in a blade-connecting member 30 for connection with the head part of liquid rocket engine thrust chamber (not shown), and a groove 32b is formed on the lower part of blade-connecting member 30, into which the head part and injector face of liquid rocket engine are inserted to remove any interference with the welding part of injector face.

A heat resistant coating layer 32c using zirconia is formed on the inner surface of blade-connecting member 30 to prevent blade-connecting member 30 from heat damage by contact with combustion gas of high temperature (refer to the enlarged cross sectional view of FIG. 2).

Furthermore, the blade-connecting member 30 is assembled with a plurality of divided parts 34, each of which is formed as one body with the corresponding blade rib member 20. Particularly, the blade-connecting member 30 is divided into six equal parts.

The blade-connecting member 30 according to the present invention is not only divided into six equal parts, but also into two or more equal parts, preferably into 2N or 2N+1 equal parts, wherein N is a natural number.

Figure 3:
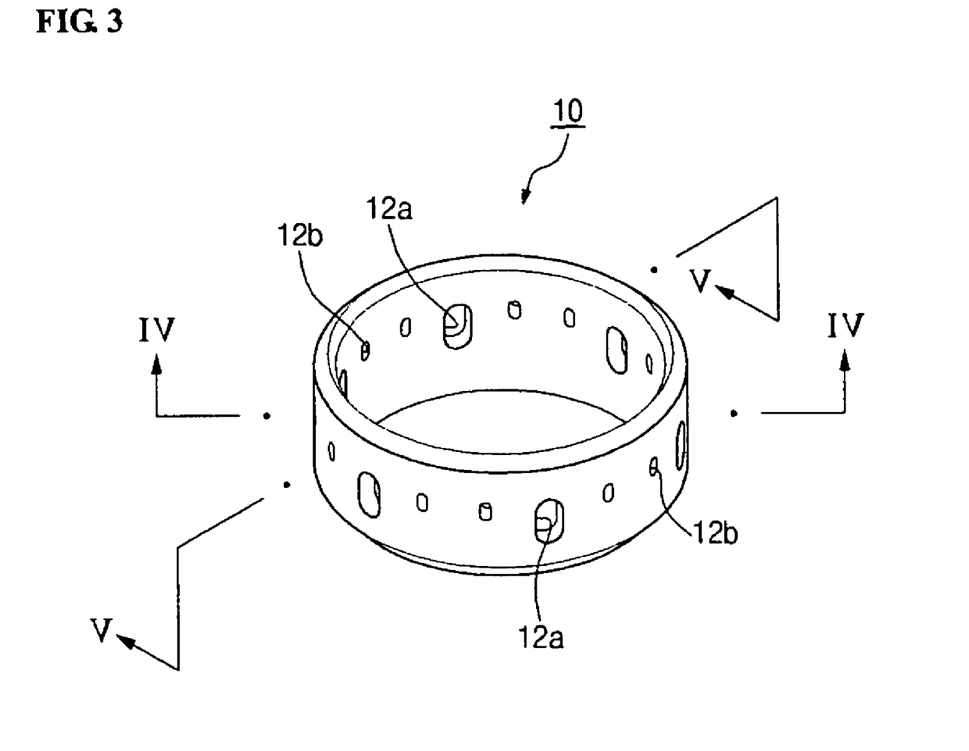
FIG. 3 is a perspective view of a hub member according to the present invention.
Figure 4:
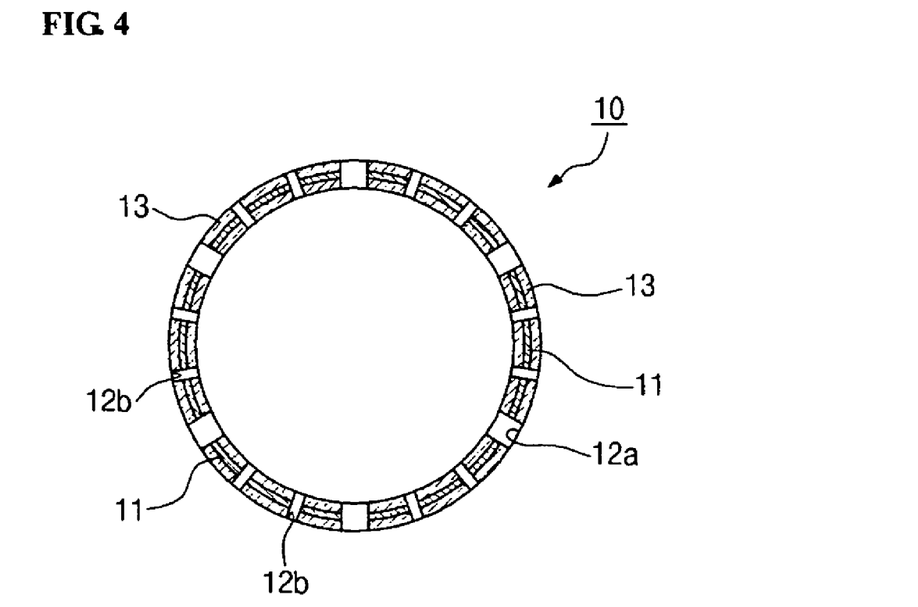
FIG. 4 is a cross sectional view taken along the lines IV—IV of FIG. 3.
Figure 5:
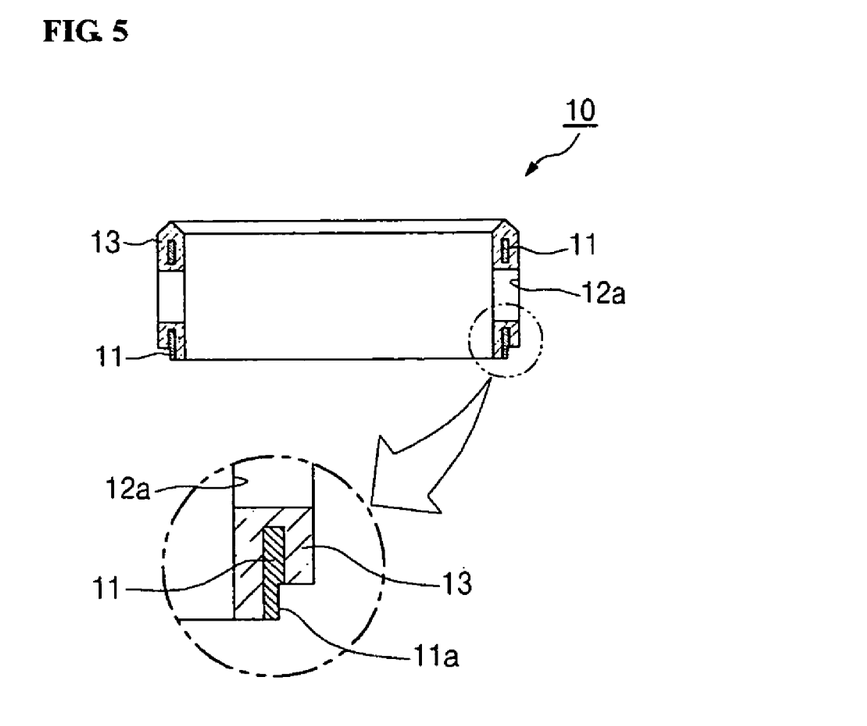
FIG. 5 is a cross sectional view taken along the lines V—V of FIG. 3.

FIG. 3 is the perspective view of a hub member according to the present invention, FIG. 4 is a cross sectional view taken along the lines IV—IV of FIG. 3, and FIG. 5 is a cross sectional view taken along the lines V—V of FIG. 3.

Referring to FIGS. 3–5, the hub member 10 according to the present invention has six connecting holes 12a and twelve ignition flame inducing holes 12b along the same circumference of the inner or outer surface of the hub member 10.

The connecting holes 12a are through-holes to which said blade rib member is connected at one end, and the ignition flame inducing holes 12b are through holes which make ignition flame generated at an initial igniter (not shown) be distributed well in a combustion chamber (not shown).

In seeing a cross section of the hub member 10, the hub member 10 comprises a first metal core 11, and a first heat resistant material 13 formed on the surface of said first metal core 11.

The outer surface of the first metal core 11 is partly exposed in the lower part to form a recess part 11a that is used for installation purpose.

Figure 6:
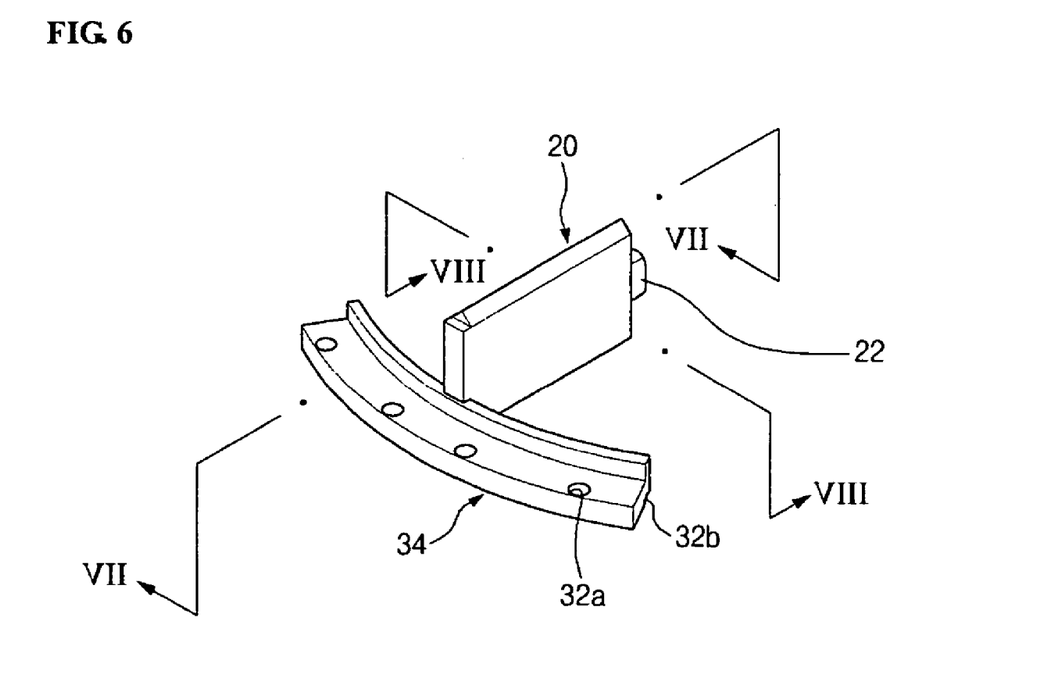
FIG. 6 is a perspective view showing a blade rib member and the divided part of a blade-connecting member according to the present invention.
Figure 7:
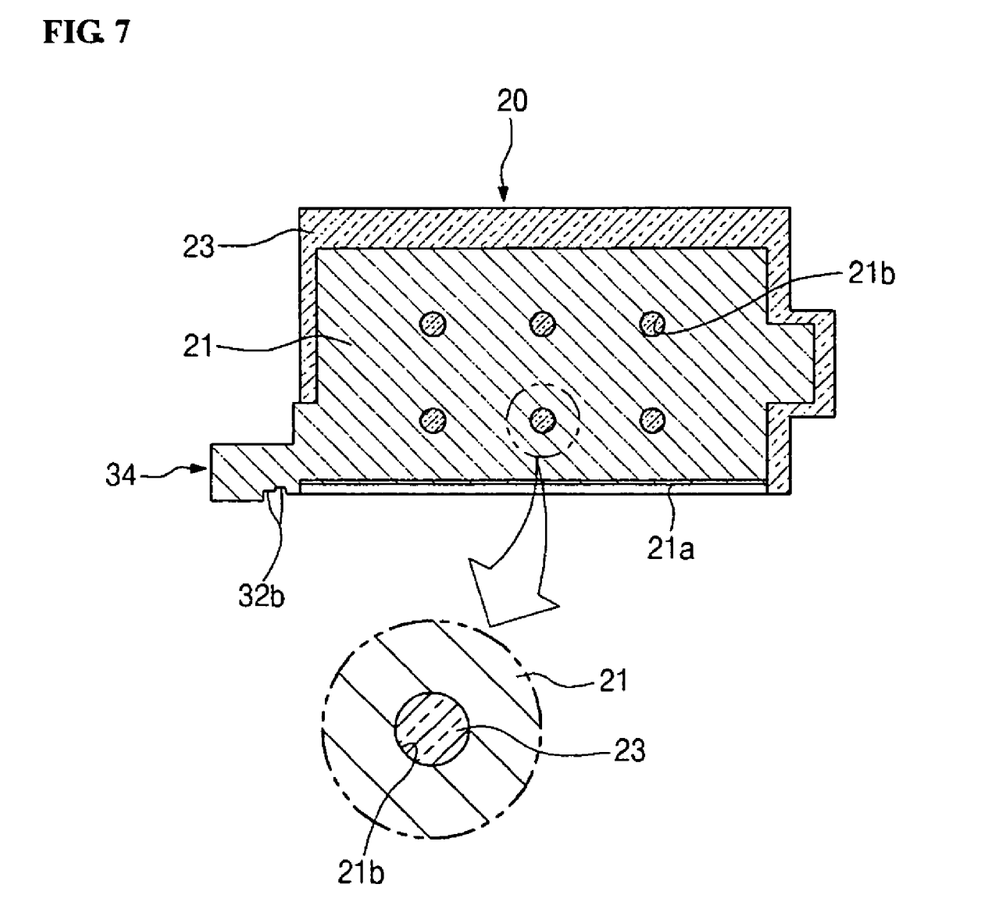
FIG. 7 is a cross sectional view taken along the lines VII—VII of FIG. 6.
Figure 8:
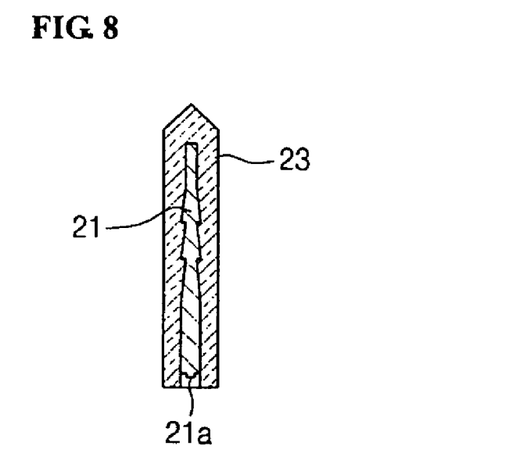
FIG. 8 is a cross sectional view taken along the lines VIII—VIII of FIG. 6.

FIG. 6 is a perspective view showing a blade rib member and a piece of a blade-connecting member according to the present invention, and FIG. 7 is a cross sectional view taken along the lines VII—VII of FIG. 6, and FIG. 8 is a cross sectional view taken along the lines VIII—VIII of FIG. 6.

Referring to FIGS. 6–8, the blade rib member 20 and the divided part 34 of the blade-connecting member 30 are formed as one body, and four second through holes 32a are formed in the divided part 34.

The blade rib member 20 comprises a second metal core 21, and a second heat resistant material 23 formed on the surface of the second metal core 21, wherein the lower part of the second metal core 21 is exposed to form a first protrusion part 21a.

Furthermore, the width-directional cross section of said second metal core 21 has a shape of a rectangular rod having a plurality of wedges formed in the longitudinal direction, and a plurality of first through holes 21b are formed in the second metal core 21, and the second heat resistant material 23 is filled in the first through-holes 21b.

A groove 32b is formed on the lower part of blade-connecting member 30, into which the head part and injector face a liquid rocket engine thrust chamber are inserted to remove any interference with the welding part of injector face.

Figure 9:
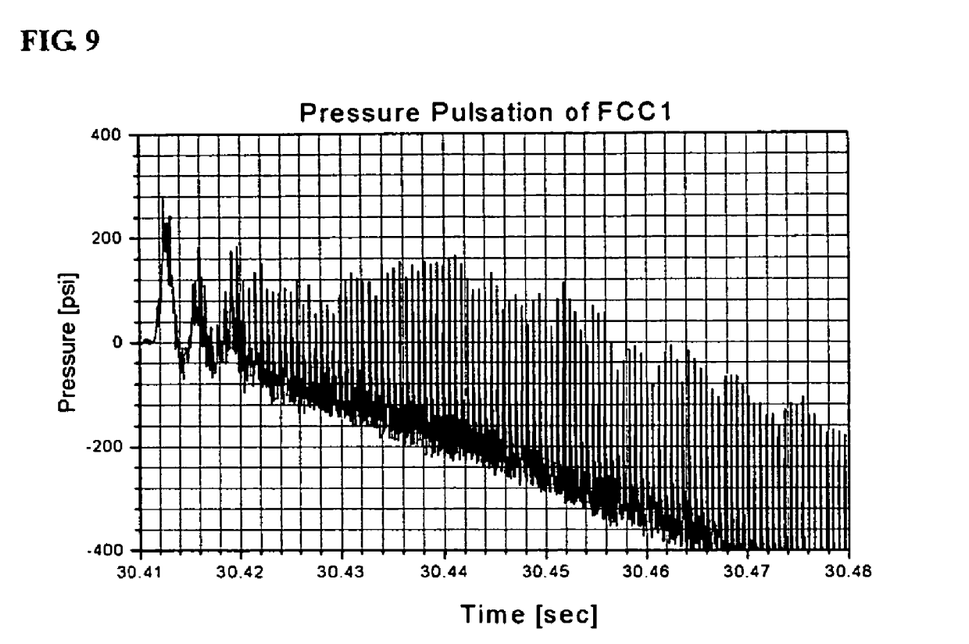
FIG. 9 is a graph showing a pressure pulsation of the inside combustion chamber of a conventional liquid rocket engine.
Figure 10:
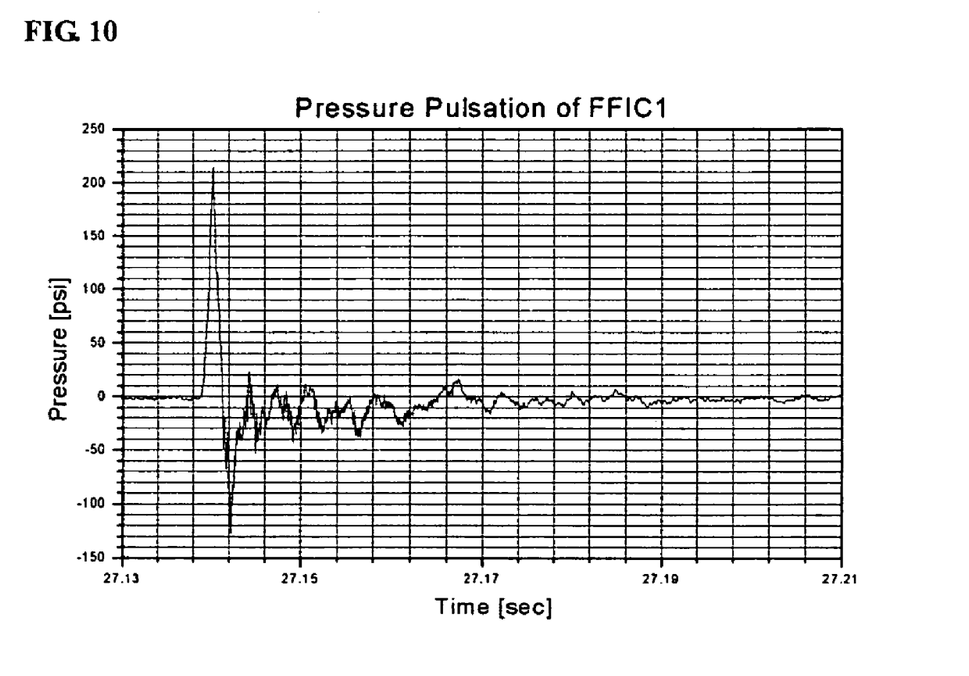
FIG. 10 is a graph showing a pressure pulsation inside combustion chamber having an ablative baffle for a liquid rocket engine thrust chamber according to the present invention.

FIG. 9 is a graph showing a pressure pulsation of the inside of a combustion chamber without the present invention and FIG. 10 is a graph showing a pressure pulsation of the inside of a combustion chamber of a liquid rocket engine having an ablative baffle for a liquid rocket engine according to the present invention.

Firstly, referring to FIG. 9, a pressure pulsation inside a combustion chamber is not damped as time goes by. Thus, this liquid rocket engine may cause the fatal problem of engine failure by increase of resonance frequency as described above.

Next, referring to FIG. 10, a pressure pulsation inside a combustion chamber of a liquid rocket engine having an ablative baffle for a liquid rocket engine according to the present invention is generated at the initial stage but damped remarkably as time goes by. Thus, the present invention fundamentally prevents such fatal problems as engine failure caused by the general liquid rocket engine, by means of damping the pressure pulsation inside combustion chamber in a short time, using an ablative baffle for a liquid rocket engine thrust chamber having a simple geometrical shape.

Figure 11:
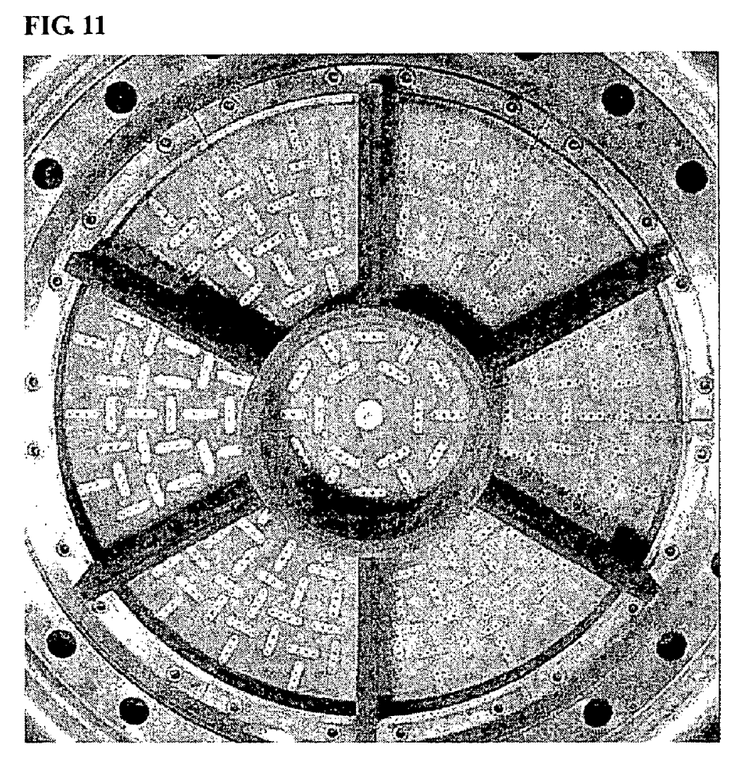
FIG. 11 is a photograph showing the state that an ablative baffle for a liquid rocket engine according to the present invention is attached to a head part of a thrust chamber.
Figure 12:
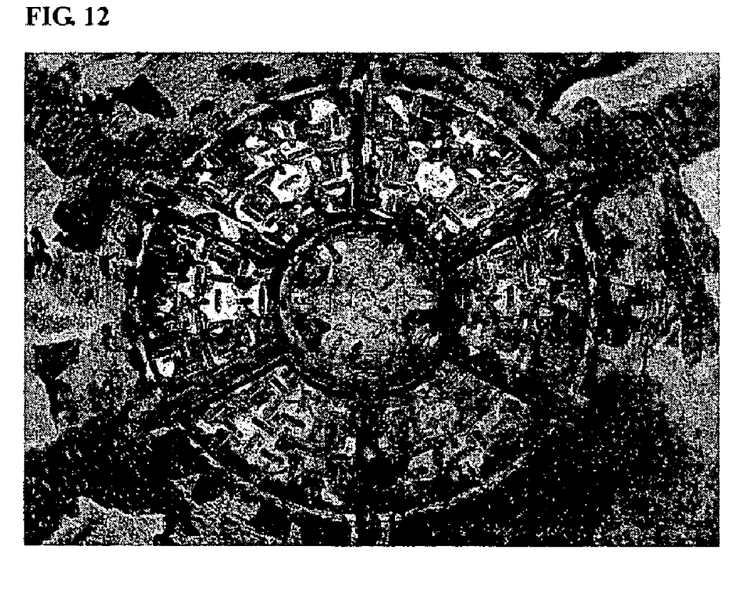
FIG. 12 is a photograph showing the state after a hot-fire combustion test in the state of FIG. 11.

FIGS. 11 and 12 are photographs showing states before and after the hot-fire combustion of liquid rocket engine having an ablative baffle for a liquid rocket engine thrust chamber according to the present invention. After the combustion, much soot is formed in the combustion chamber of the liquid rocket engine, but an ablative baffle for a liquid rocket engine thrust chamber according to the present invention is not damaged and maintains the shape set up initially.

The present invention described above has merits as follows.

Firstly, the present invention does not use a conventional internal cooling method, but an ablation cooling method using the composite heat resistant material structure with a metal core, so that a liquid rocket engine system may be simplified, and the reliability of liquid rocket engine increases, and the manufacturing cost is cut down.

Secondly, the present invention can reduce the combustion instability by damping pressure pulsations generated in the combustion chamber of a liquid rocket engine in a short time when a liquid rocket engine is ignited. Consequently, the present invention can prevent melting or the breakdown of baffles, breakdown of tanks, and so on caused by combustion instability.

Thirdly, the present invention enables an ablative baffle for a liquid rocket engine thrust chamber to be attached to and detached from the head part of liquid rocket engine thrust chamber without structural change of the liquid rocket engine thrust chamber. Thus, when an ablative baffle is damaged in developing a liquid rocket engine, only the replacement of the ablative baffle is necessary without the re-manufacturing of the head part of a liquid rocket engine thrust chamber.

Fourthly, the present invention has a simple structure, so that the manufacturing cost may be cut down, and the maintenance and repair are easy on account of easy attachment and detachment. Thus, the present invention can reduce the time of development of liquid rocket engine having combustion stability.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims.

What is claimed is:

1. An ablative baffle for a liquid rocket engine thrust chamber, comprising:
    a hub member having a hollow structure, of which the top and bottom parts are opened;
    a plurality of blade rib members, each of which is connected removably at one end to the outer surface of said hub member; and
    a blade-connecting member having a hollow structure, of which the top and bottom parts are opened, and to the inner part of which each of said blade rib members is connected at the other end,
    wherein said hub member comprises:
    a first metal core; and
    a first heat resistant material formed on the surface of said first metal core, and
    wherein each of said blade rib members comprises:
    a second metal core; and
    a second heat resistant material formed on the surface of said metal core.

2. The ablative baffle in claim 1, wherein said hub member has a ring shape.

3. The ablative baffle in claim 2, wherein said hub member has a plurality of connecting holes to each of which said blade rib member is connected at one end, and has a plurality of ignition flame inducing holes smaller than said connecting holes.

4. The ablative baffle in claim 3, wherein centers of said connecting holes and said ignition flame inducing holes are on the same circumference of the inner or outer surface of said hub member.

5. The ablative baffle in claim 1, wherein the outer surface of said first metal core is partly exposed in the lower part to form a recess part that is used for installation purpose.

6. The ablative baffle in claim 1, wherein the lower part of said second metal core is exposed to form a first protrusion part.

7. The ablative baffle in claim 1, wherein width-directional cross section of said second metal core has a shape of a rectangular rod having a plurality of wedges formed in the longitudinal direction.

8. The ablative baffle in claim 1, wherein a plurality of first through holes are formed in said second metal core.

9. The ablative baffle in claim 1, wherein said blade-connecting member has a ring shape.

10. The ablative baffle in claim 9, wherein a groove is formed on the lower surface of said blade-connecting member.

11. The ablative baffle in claim 1, wherein a plurality of second through holes are formed in said blade-connecting member.

12. The ablative baffle in claim 11, wherein a zirconia heat resistant coating layer is formed on the inner surface of said blade-connecting member.

13. The ablative baffle in claim 1, wherein said blade-connecting member is lower in height than said blade rib member or said hub member.

14. The ablative baffle in claim 1, wherein said blade-connecting member is assembled with a plurality of divided parts, each of which is connected to said blade rib member.

15. The ablative baffle in claim 14, wherein said blade rib member and said divided part are formed as one body.

16. The ablative baffle in claim 15, wherein said blade-connecting member is assembled with equal divided parts of 2N or 2N+1 wherein N is a natural number.

17. The ablative baffle in claim 14, wherein said blade-connecting member is assembled with equal divided parts of 2N or 2N+1 wherein N is a natural number.

18. An ablative baffle for a liquid rocket engine thrust chamber, comprising:
   a hub member having a hollow structure, of which the top and bottom parts are opened, and having a plurality of connecting holes;
   a plurality of blade rib members, each of which has a protrusion part being inserted into the connecting hole; and
   a blade-connecting member having a hollow structure, of which the top and bottom parts are opened, and to the inner part of which each of said blade rib members is connected,
   wherein said blade-connecting member is assembled with a plurality of divided parts, each of which is connected to said blade rib member.

* * * * *